United States Patent

Billawala

[15] 3,657,710

[45] Apr. 18, 1972

[54] MULTIPLE SURFACE FLUID FILM BEARING

[72] Inventor: Shahbuddin A. Billawala, Thousand Oaks, Calif.

[73] Assignee: Burroughs Corporation, Detroit, Mich.

[22] Filed: Jan. 13, 1971

[21] Appl. No.: 106,294

Related U.S. Application Data

[63] Continuation of Ser. No. 868,502, Oct. 22, 1969, abandoned.

[52] U.S. Cl. ............340/174.1 E, 179/100.2 P, 308/DIG. 1, 308/5

[51] Int. Cl. ..................................G11b 5/60, G11b 21/20

[58] Field of Search ....................................308/DIG. 1, 5

[56] References Cited

UNITED STATES PATENTS

| | | | |
|---|---|---|---|
| 3,193,835 | 7/1965 | Wadey | 340/174.1 E |
| 3,249,701 | 5/1966 | Silver | 340/174.1 E |
| 3,416,148 | 12/1968 | Berghaus | 340/174.1 E |

*Primary Examiner*—Bernard Konick
*Assistant Examiner*—Vincent P. Canney
*Attorney*—Christie, Parker and Hale

[57] ABSTRACT

A fluid film bearing particularly suitable for the magnetic recording head of a rotating disk magnetic memory is described. The head has a bearing surface which is adapted to float in very close proximity to a magnetic memory surface moving at a relatively high velocity. The relative velocities are such that a stable film of air, a few tens of micro-inches thick, separates the recording head from the memory element. A conventional stabilizing bearing surface is provided along the leading edge of the plane bearing surface and angulated at a very small angle relative thereto. In the improved bearing a second stabilizing bearing surface is disposed along the leading edge of the first stabilizing bearing surface and angulated relative thereto so as to be at a greater angle relative to the plane bearing surface than is the first stabilizing bearing surface.

14 Claims, 5 Drawing Figures

Patented April 18, 1972 3,657,710

INVENTOR.
SHAHBUDDIN A. BILLAWALA

BY

Christie, Parker & Hale
ATTORNEYS

MULTIPLE SURFACE FLUID FILM BEARING

This application is a continuation of Application Ser. No. 868,502, filed Oct. 22, 1969 and now abandoned.

BACKGROUND OF THE INVENTION

This invention is in the field of fluid film bearings and more particularly in the field of magnetic recording heads for reading and writing on magnetic recording surfaces.

A magnetic head mounting apparatus is described in U.S. Pat. No. 3,310,792 to R. G. Groom et al. Briefly, in this patent a resilient gimbal mounting is provided for a magnetic recording head which is adapted to float on an air film adjacent the surface of a rapidly moving disk memory or the like. It is common in this art to speak of the recording head "flying" adjacent the memory surface.

Magnetic recording heads of the type commonly used for reading and writing on magnetic recording means such as rotating magnetic recording disks and magnetic recording drums are often used for recording digital information at extremely high data densities, that is, many data bits per unit area. As the density at which information is recorded on the magnetic recording surface is increased, the gap between the magnetic recording head and the magnetic recording surface must be decreased to prevent interference between adjacent data bits. The smaller the gap and the closer the magnetic head is positioned with respect to the moving recording surface the more difficult it becomes to control the mechanical tolerances of the structure mounting the recording head. To overcome these mechanical difficulties, magnetic recording and reading transducers are placed in assemblies commonly known as recording heads, adapted for floating or flying on a thin film of air caused by the moving magnetic recording surface. The aforementioned patent describes in detail a suitable mechanical arrangement for mounting the magnetic head and the teachings of this patent are hereby incorporated by reference for full force and effect as if set forth in full herein.

The magnetic head provided in the aforementioned patent has a conventional arrangement for providing the thin fluid film. Thus, there is provided a plane bearing surface which normally lies substantially parallel to the rapidly moving magnetic recording surface and is separated therefrom by a thin film of air. Along the leading edge of the plane bearing surface there is a stabilizing bearing surface disposed at a slight angle relative to the plane bearing surface to define a slightly wedge shaped gap between the stabilizing bearing surface and the moving magnetic surface. This wedge shaped gap between the stabilizing surface and the magnetic memory surface is more open at the leading edge of the magnetic recording head and tapers to a more narrow opening at the line where the stabilizing bearing surface joins the plane bearing surface. Conventionally the angle between the stabilizing bearing surface and the plane bearing surface is only a few minutes of arc in bearings adapted to operate with a thin air film or other gas film at high relative surface velocity.

In the operation of a fluid film bearing it is desirable to have a "spring constant" for the bearing as large as possible. As used herein, spring constant is employed to mean the force per unit distance required to move the magnetic recording head closer to the moving magnetic surface against the resistance provided by the fluid film, such as, for example, the additional ounces of force required to move the magnetic head one micro-inch toward the recording surface. When the spring constant of the thin film bearing is high, greater tolerance in the force applied to the magnetic recording head can be accepted.

Likewise, in reliably operating a magnetic recording head at a very small distance from a recording surface, or in any other fluid bearing, it is important to keep the head from becoming unstable and crashing into the rapidly moving surface, an accident which may effectively destroy both the magnetic head and a portion of the memory disk.

Due to mechanical limitations, the moving surface of the magnetic memory element can seldom be maintained perfectly flat. The moving surface may have a degree of waviness or roughness, may have an initial or static position variation, or may have variations in position due to harmonic vibration, or external disturbing accelerations. In designing a particular fluid film bearing, the degree of imperfection can be anticipated to a certain extend and the spring constant of bearing mounting springs and the load pressing the bearing surfaces together can readily be matched so that the bearing will float over all expected imperfections with a selected tolerance in the gap between the relatively moving surfaces.

However, in the case of unanticipated variations or imperfections or relatively minute contamination, the conventional fluid film bearing may become unstable and the magnetic recording head may tilt and come in contact with or "crash" into the rapidly moving surface damaging or destroying both. It is therefore highly desirable to provide a fluid film bearing having a high degree of stability, that is, low probability of crashing into the moving surface.

BRIEF SUMMARY OF THE INVENTION

Thus in the practice of this invention according to the preferred embodiment, there is provided an improved fluid film bearing having a first bearing surface adapted to float on a fluid film adjacent a surface moving relative thereto, and a second bearing surface angulated relative to the first bearing surface and disposed along the leading edge of the bearing surface, plus a third stabilizing bearing surface angulated relative to both the first bearing surface and the second bearing surface and disposed along the leading edge of the second bearing surface. Such a bearing is highly stable and also has a higher than expected spring constant.

DRAWINGS

Objects and many of the attendant advantages of this invention will be appreciated as the same become better understood by reference to the following detailed description when considered in conjunction with the accompanying drawings wherein.

Throughout the drawings like reference numerals refer to like parts.

PRIOR ART BEARING

Figure 1:
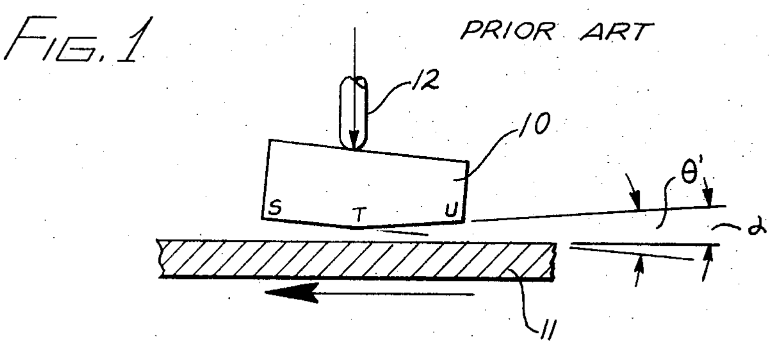
FIG. 1 illustrates schematically a prior art fluid film bearing.

The type of instability that may occur in a prior art fluid film bearing may be understood in relation to the magnetic head illustrated in the schematic drawing of FIG. 1. As illustrated therein, a conventional magnetic recording head 10 is arranged adjacent a rapidly moving magnetic recording member such as a rotating disk moving in a direction indicated by the arrow. The magnetic recording head 10 has a plane bearing surface ST extending between the trailing edge S of the magnetic head and the leading edge T of the plane bearing surface. During normal operation of the magnetic head the plane bearing surface ST is substantially parallel to the surface of the rapidly moving magnetic disk 11. The magnetic recording head 10 also has a flat stabilizing bearing surface TU extending from the leading edge T of the plane bearing surface ST to the leading edge U of the magnetic head.

The stabilizing bearing surface TU is angulated relative to the plane bearing surface ST by an angle $\theta'$. It will readily be appreciated that the angle $\theta'$ in FIG. 1 is greatly exaggerated for purposes of illustration and in an actual magnetic recording head having a high bearing load would be less than about 30 minutes of arc.

The magnetic recording head 10 is forced toward the magnetic memory disk 11 by a piston 12 which may be operated by pneumatic pressure to maintain the gap between the head and disk at a relatively small value. The location of application of force by the piston 12 is arranged so that the surface ST should lie substantially parallel to the magnetic disk 11 during operation. In actual operation, however, the surface ST may not be exactly parallel to the moving disk as illustrated in FIG. 1. This variation from parallelism can be defined by an angle $\alpha$ between the stabilizing bearing surface TU and the surface of the magnetic disk 11.

The angle $\alpha$ may be greater than the angle $\theta'$ if the location of application of force by the piston is aft of the center of pressure of the fluid film bearing. Similarly the angle $\alpha$ may be less than the angle $\theta'$ if the location of application of force by the piston is forward of the center of pressure of the fluid bearing. Generally speaking, as the angle $\alpha$ decreases, the center of pressure of the fluid film bearing moves forward thereby providing a restoring moment about the location of application of force by the piston 12 so that the bearing is stabilized and the leading edge U of the magnetic recording head is prevented from crashing into the rapidly moving surface of the disk. If, however, due to some local variation in the surface of the disk, contamination, or other unexpected disturbing influence the angle $\alpha$ becomes substantially zero or negative, there is no restoring moment and the bearing is unstable so that the head crashes into the disk. It may also occur that even before the angle $\alpha$ becomes zero the force generated by the fluid film is less than the force applied by the piston and the head may touch the moving surface with consequent damage to both.

DESCRIPTION

Figure 2:
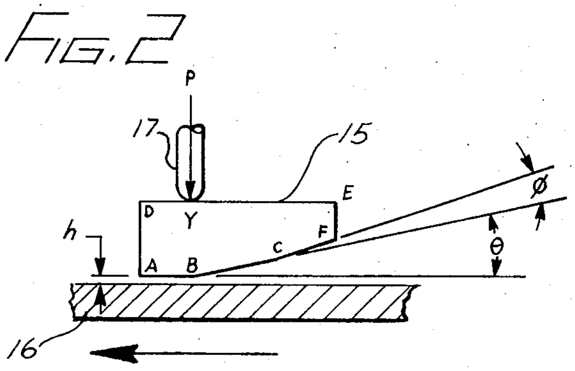
FIG. 2 illustrates in side view a schematic representation of a magnetic recording head having a fluid film bearing incorporating the principles of this invention.
Figure 3:
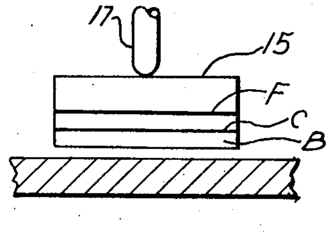
FIG. 3 is an end view of the recording head of FIG. 2.

With this background in mind, advantages of the present invention can be readily appreciated. Thus, FIGS. 2 and 3 illustrate a magnetic recording head constructed according to the principles of this invention. As illustrated in this embodiment, the magnetic recording head 15 is arranged to fly or float adjacent a rapidly moving magnetic memory disk 16 in the same general arrangement as hereinabove described. The gimbal mechanisms employed for mounting the magnetic recording head are not illustrated herein, however, it will be understood that they may be mechanisms exactly as described in the aforementioned patent or other conventional mounting means as will be apparent to one skilled in the art. A preferred mounting mechanism includes a pneumatically actuated piston 17 which serves to apply a force P to the back side of the magnetic recording head and urge the head toward the magnetic memory disk against the resistance of the fluid film.

The magnetic recording has a plane bearing surface AB defined by a trailing edge A which is the trailing edge of the magnetic recording head and a leading edge B. During normal operation of the magnetic recording head, the plane bearing surface AB is spaced from the rapidly moving magnetic memory disk 16 by a small distance $h$. Forwardly of the plane bearing surface AB is a flat stabilizing bearing surface BC the trailing edge B of which is the leading edge of the bearing surface AB. The stabilizing bearing surface BC is angulated relative to the plane bearing surface AB at a small angle $\phi$ which is greatly exaggerated in the schematic views and which in actual practice is only a few minutes of arc.

Forwardly of the first stabilizing bearing surface BC is a second flat stabilizing bearing surface CF the trailing edge C of which is the leading edge C of the first stabilizing bearing surface BC, and the leading edge F of which is also the leading edge of the magnetic recording head. The second stabilizing bearing surface CF is angulated relative to the first stabilizing bearing surface BC by a small angle $\phi$. The back surface DE of the magnetic recording head has a trailing edge D and a leading edge E and the location of application of the force P by the piston 17 can be considered to be at point Y, that is, at a distance DY from the trailing edge of the magnetic recording head.

During normal operation of the magnetic recording head, the surface AB floats substantially parallel to the surface of the magnetic memory disk 16 since the center of pressure of the fluid film bearing is substantially aligned with the point Y where the force P is exerted. During such operation, the fluid film bearing is effectively defined by the plane bearing surface AB and the first stabilizing bearing surface BC substantially as provided in the prior art. It is believed that the additional stabilizing bearing surface CF has a relatively minor effect on the location of the center of pressure when the plane bearing surface AB is parallel to the moving disk.

Figure 4:
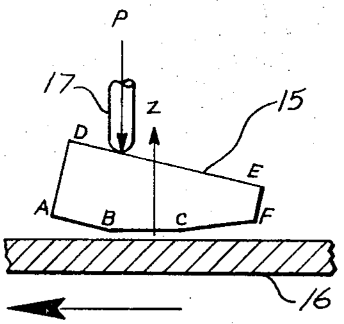
FIG. 4 illustrates the magnetic recording head of FIG. 2 in another position.

A significant contribution of the additional stabilizing surface CF becomes apparent when the magnetic recording head 15 becomes slightly cocked such as indicated in FIG. 4. As was pointed out hereinabove, the recording head may tilt due to unanticipated disturbances or contamination so that the bearing surface AB is no longer parallel to the surface of the magnetic memory disk, and a situation may very well occur where the first stabilizing bearing surface BC is parallel to the moving disk or at only a very small angle therefrom. In the prior art bearing such a situation results in crashing of the head into the disk.

In a magnetic recording head having an additional stabilizing bearing surface CF there still exists a stabilizing bearing surface CF even when the head tilts so that the original stabilizing bearing surface BC is parallel to the magnetic disk. This additional stabilizing bearing surface CF not only prevents the magnetic recording head from crashing into the disk, but it also cooperates with the first stabilizing bearing surface BC to effectively form a new fluid film bearing having a center of pressure as indicated schematically by the arrow Z which is well forward of the point Y where the piston applies the force P. This newly located center of pressure exerts a strong restoring moment about the point Y and returns the bearing towards its original and usual operating position.

The excellent stability of the fluid film bearing having three mutually angulated surfaces AB, BC, and CF, is demonstrated by substantial testing wherein over 2,000 hours of operating time have been accumulated on approximately 50 different magnetic recording heads without ever having a head contact or crash into a magnetic recording disk.

Because of the excellent stability of the fluid film bearing, it is now possible to operate the magnetic recording head reliably at a spacing h from the recording disk of only 35 microinches. Previously in order to achieve reliable operation with a fluid film bearing having only two surfaces, a spacing of 60 micro-inches or more was required. The ability to reduce the spacing between the magnetic recording head and the magnetic memory disk by a factor of nearly one half is highly advantageous in a high density data storage system since the density at which data can be stored on a magnetic memory disk without interference between adjacent data bits is closely related to the spacing between the recording head and the memory element. The ability to operate the magnetic recording head at the spacing of only 35 micro-inches as compared with the previous 60 micro-inches causes a substantial increase in the density at which data can be stored.

In addition to the enhanced reliability of operation of the fluid film bearing and the decreased gap between the bearing surfaces, it was also surprisingly found that the spring constant of the bearing is increased by about 50 percent. Thus it is found that a much larger variation in the force P can be tolerated in the fluid film bearing having three surfaces without significant changes in the spacing $h$ as compared with the fluid film bearing having only two surfaces. As mentioned hereinabove, this increased spring constant permits much greater tolerance in manufacture and operation of the magnetic recording head since the precision required in the mechanisms for generating the force P is decreased.

The additional stabilizing bearing surface provides a large restoring moment on the bearing when it is displaced from its normal operating position as compared with the two surface fluid film bearing. Because of this, the bearing operates with the bearing surface AB more nearly parallel to the surface of the magnetic memory disk than has previously been the case. With such an enhanced parallelism the force required to decrease the gap $h$ is increased, that is, the spring constant is higher.

The increased spring constant provided in the fluid film bearing having three surfaces also means that the gap $h$ remains more nearly constant during operation of the bearing despite minor variations in pneumatic pressure on the piston 17 or the like. This constancy of gap assures that magnetic signals between the magnetic recording head and memory element are more nearly constant which further enhances reliable operation of the entire memory system.

The exact design of a fluid film bearing for a particular application depends on a large number of factors such as the desired load on the bearing, the characteristics of the fluid within the bearing, the relative velocity of the surfaces, and physical sizes. In the usual course of designing a bearing many of these factors are determined by other characteristics of the equipment, and the dimensions of the plane bearing face and stabilizing bearing faces, and the relative angles therebetween are selected analytically and then tested empirically to optimize a design.

Figure 5:
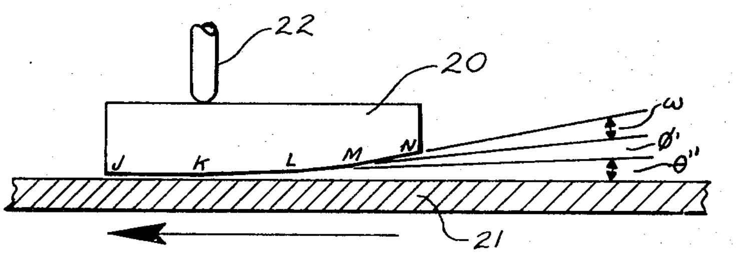
FIG. 5 illustrates another embodiment of magnetic recording head incorporating the principles of this invention.

In another embodiment of a fluid film bearing, three stabilizing bearing surfaces can be employed. Thus as illustrated in FIG. 5, there is provided a magnetic recording head 20 adapted to operate adjacent a rapidly moving magnetic disk 21 and is urged toward the disk by a piston 22 in substantially the same manner as hereinabove described. The magnetic recording head 20 has a plane bearing surface JK adjacent its trailing edge which in the normal course of operation lies substantially parallel to the moving magnetic disk 21. Forwardly of the bearing surface JK and disposed along the leading edge thereof is a first flat stabilizing bearing surface KL angulated relative thereto at an angle $\theta''$ for forming a fluid film bearing. Forwardly of the first stabilizing bearing surface KL and disposed along the leading edge thereof is a second flat stabilizing bearing surface LM angulated relative to the first stabilizing bearing surface KL by a very small angle $\theta'$ in the order of a few minutes of arc. Forwardly of the second stabilizing surface LM is a third stabilizing bearing surface MN extending from the leading edge M of the second flat stabilizing bearing surface to the leading edge N of the magnetic recording head. The third stabilizing bearing surface MN is angulated relative to the second stabilizing bearing surface LM by a small angle $\omega$.

The fluid film bearing provided by the four surfaces JK, KL, LM and MN performs in a manner similar to the performance of the fluid film bearing hereinabove described and illustrated in FIG. 2, except that by addition of a third stabilizing bearing surface MN there is a greater nonlinearity in the increase in restoring moment as the bearing becomes tilted. Ordinarily it is found that the addition of a third stabilizing bearing surface does not cause sufficient increase in stability or spring constant of the fluid film bearing to justify the increase in manufacturing cost associated with producing additional surfaces at carefully controlled angle. In situations, however, where increased stability is desired with an ability to accommodate unanticipated irregularities, a fluid film bearing having three or even more stabilizing surfaces may be advantageous.

It will further be apparent to one skilled in the art that in lieu of having three or more flat surfaces to form the fluid film bearing, that a curved surface extending forwardly of the plane bearing surface may advantageously be employed if desired. Generally speaking, it is preferred to employ flat stabilizing bearing surfaces on the fluid film bearing since such flat surfaces can be readily manufactured by lapping or other conventional optical techniques with appreciably lower cost than carefully controlled curved surfaces.

It will also be clear that although the fluid film bearing had been described in relation to a magnetic recording head and has particular merit in such an application, that is is also useful in other places where fluid film bearings are suitable. In the illustrated embodiment a rotating disk memory is employed, however, a fluid film bearing is also applicable to rotating drum memories either for the recording heads or for the drum support bearings. It will also be apparent that either portion of the bearing may be moving and relative motion therebetween is the significant fluid film forming factor. Other modifications and variations of the present invention will be apparent to one skilled in the art.

I claim:

1. A fluid film bearing comprising:
- a first bearing member;
- a second bearing member very closely spaced from the first bearing member, the first and second bearing members adapted to move relative to each other at a sufficient velocity to form a fluid film bearing therebetween;
- a first plane bearing surface on the second bearing member and having a leading edge and a trailing edge;
- a second plane bearing surface on the second bearing member and having a leading edge and a trailing edge, the trailing edge of the second bearing surface being the leading edge of the first bearing surface, the plane of said second bearing surface being angulated relative to the plane of the first bearing surface at a very small angle for forming a fluid film bearing;
- a third plane bearing surface on the second bearing member and having a leading edge and a trailing edge, the trailing edge of the third bearing surface being the leading edge of the second bearing surface, the plane of said third bearing surface being angulated relative to the plane of the second bearing surface at a small angle for enhancing stability of the fluid film bearing; and
- means for biasing the second bearing member towards the first bearing member and for mounting the second bearing member for pivoting about a point substantially on the opposite side thereof from the first bearing surface during normal operation.

2. A fluid film bearing as defined in claim 1 further comprising a fourth plane bearing surface on the second bearing member and having a leading edge and a trailing edge, the trailing edge of the fourth bearing surface being the leading edge of the third bearing surface, the plane of said fourth bearing surface being angulated relative to the plane of the third bearing surface at a small angle for further enhancing stability of the second bearing member.

3. In a tapered land fluid film bearing having a first plane bearing surface adapted to float adjacent a bearing member moving relative thereto and a second plane bearing surface angulated relative to the first bearing surface and disposed along the leading edge of the first bearing surface, and means for mounting for pivoting about a point substantially opposite the first bearing surface during normal operation, the improvement comprising:
- a third plane bearing surface angulated relative to the first bearing surface and the second bearing surface, and disposed along the leading edge of the second bearing surface.

4. A fluid film bearing as defined in claim 3 wherein the third bearing surface is angulated relative to the first bearing surface at a larger angle than the second bearing surface is angulated relative to the first bearing surface.

5. An improved recording head for a magnetic memory wherein the memory element and the head are in sufficiently rapid relative movement to provide a stable fluid film comprising:
- a first plane bearing surface on a portion of the body adapted to float adjacent the memory element;
- a second plane stabilizing bearing surface angulated relative to the first bearing surface and disposed along the leading edge thereof;
- a third plane stabilizing surface angulated relative to the first bearing surface and the second stabilizing bearing surface, and disposed along the leading edge of the second stabilizing bearing surface; and means on the opposite side of the body from the first bearing surface for biasing the recording head towards the memory element and for mounting the head for pivoting about a point on the opposite side of the body from the first bearing surface.

6. A memory system comprising:

a magnetic memory element;

a magnetic recording head, said memory element and recording head being relatively movable at a sufficient velocity to provide a stable fluid film bearing; said recording head including:

a first plane bearing surface on a portion of the head adjacent the memory element for mounting a magnetic recording transducer;

a second plane stabilizing bearing surface angulated relative to the plane of the first bearing surface and disposed along the leading edge thereof;

a plane stabilizing bearing surface angulated relative to the plane of the first bearing surface and the plane of the second stabilizing bearing surface and disposed along the leading edge of the second stabilizing bearing surface; and means on the opposite side of the recording head from the first bearing surface for biasing the head toward the memory element and for mounting the head for pivoting about a point on the opposite side thereof from the first bearing surface.

7. A memory system as defined in claim 6 wherein the memory element comprises a rotatable magnetic memory disk, and the recording head is arranged adjacent one side of the disk.

8. A fluid film bearing comprising:

a first bearing member;

a second bearing member very closely spaced from the first bearing member, the first and second bearing members adapted to move relative to each other at a sufficient velocity to form a fluid film bearing therebetween;

a first plane bearing surface on the second bearing member and having a leading edge and a trailing edge;

a second plane bearing surface on the second bearing member and having a leading edge and a trailing edge, the trailing edge of the second bearing surface being the leading edge of the first bearing surface, the plane of said second bearing surface being angulated relative to the plane of the first bearing surface at a very small angle for forming a fluid film bearing;

a third plane bearing surface on the second bearing member and having a leading edge and a trailing edge, the trailing edge of the third bearing surface being the leading edge of the second bearing surface, the plane of said third bearing surface being angulated relative to the plane of the second bearing surface at a small angle for enhancing stability of the fluid film bearing; and means for biasing the second bearing member towards the first bearing member and for mounting the second bearing member for pivoting about a point substantially on the opposite side from the center of pressure on the bearing surfaces during normal operation.

9. A fluid film bearing as defined in claim 8 further comprising a fourth plane bearing surface on the second bearing member and having a leading edge and a trailing edge, the trailing edge of the fourth bearing surface being the leading edge of the third bearing surface, the plane of said fourth bearing surface being angulated relative to the plane of the third bearing surface at a small angle for further enhancing stability of the second bearing member.

10. In a tapered land fluid film bearing having a first plane bearing surface adapted to float adjacent a bearing member moving relative thereto and a second plane bearing surface angulated relative to he first bearing surface and disposed along the leading edge of the first bearing surface, and means for mounting for pivoting about a point substantially opposite the center of pressure on the bearing surfaces during normal operation, the improvement comprising:

a third plane bearing surface angulated relative to the first bearing surface and the second bearing surface, and disposed along the leading edge of the second bearing surface.

11. A fluid film bearing as defined in claim 10 wherein the third bearing surface is angulated relative to the first bearing surface at a larger angle than the second bearing surface is angulated relative to the first bearing surface.

12. An improved recording head for a magnetic memory wherein the memory element and the head are in sufficiently rapid relative movement to provide a stable fluid film comprising:

a body for supporting at least one magnetic element;

a first plane bearing surface on a portion of the body adapted to float adjacent the memory element;

a second plane stabilizing bearing surface angulated relative to the first bearing surface and disposed along the leading edge thereof;

a third plane stabilizing surface angulated relative to the first bearing surface and the second stabilizing bearing surface, and disposed along the leading edge of the second stabilizing bearing surface; and means on the opposite side of the body from the center of pressure on the bearing surfaces for biasing the recording head towards the memory element and for mounting the head for pivoting about a point on the opposite side of the body from the center of pressure on the bearing surfaces.

13. A memory system comprising:

a magnetic memory element;

a magnetic recording head, said memory element and recording head being relatively movable at a sufficient velocity to provide a stable fluid film bearing; said recording head including:

a first plane bearing surface on a portion of the head adjacent the memory element for mounting a magnetic recording transducer;

a second plane stabilizing bearing surface angulated relative to the plane of the first bearing surface and disposed along the leading edge thereof;

a plane stabilizing bearing surface angulated relative to the plane of the first bearing surface and the plane of the second stabilizing bearing surface, and disposed along the leading edge of the second stabilizing bearing surface; and means on the opposite side of the recording head from the center of pressure on the bearing surfaces for biasing the head toward the memory element and for mounting the head for pivoting about a point on the opposite side thereof from the center of pressure on the bearing surfaces.

14. A memory system as defined in claim 13 wherein the memory element comprises a rotatable magnetic memory disk, and the recording head is arranged adjacent one side of the disk.

* * * * *

PO-1050
(5/69)

UNITED STATES PATENT OFFICE
CERTIFICATE OF CORRECTION

Patent No. 3,657,710 Dated April 18, 1972

Inventor(s) Shahbuddin A. Billawala

It is certified that error appears in the above-identified patent and that said Letters Patent are hereby corrected as shown below:

Column 2, line 6, "extend" should be --extent.

Column 3, line 52, insert --head-- between "recording" and "has";

Column 3, line 61, "Ø" should be -- θ --.

Column 5, line 39, "θ" should be -- Ø --;

Column 5, line 71, "had" should be --has--.

Column 8, line 6, "he" should be --the--.

Signed and sealed this 26th day of September 1972.

(SEAL)
Attest:

EDWARD M.FLETCHER,JR.
Attesting Officer

ROBERT GOTTSCHALK
Commissioner of Patents